Patented Dec. 20, 1938

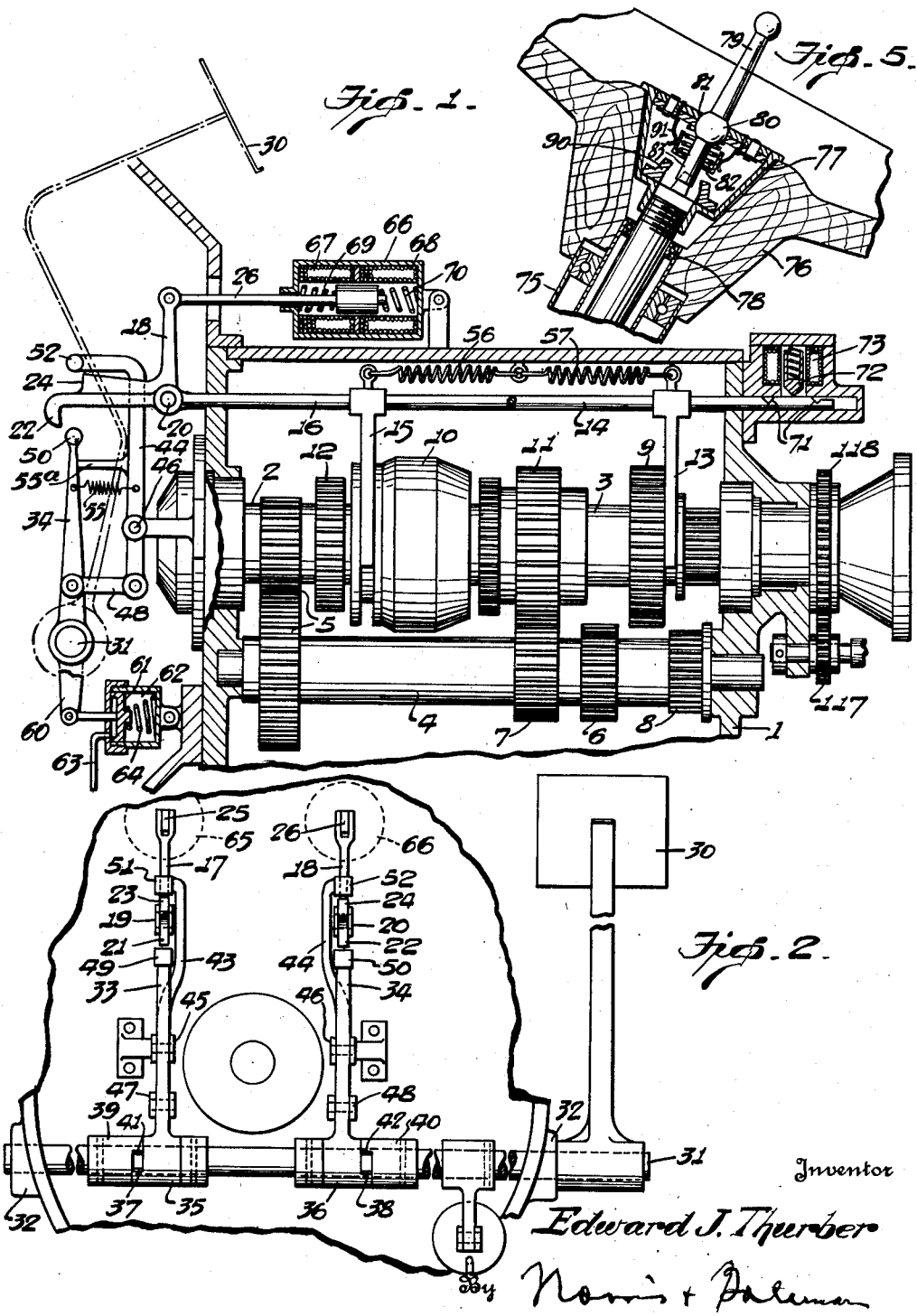

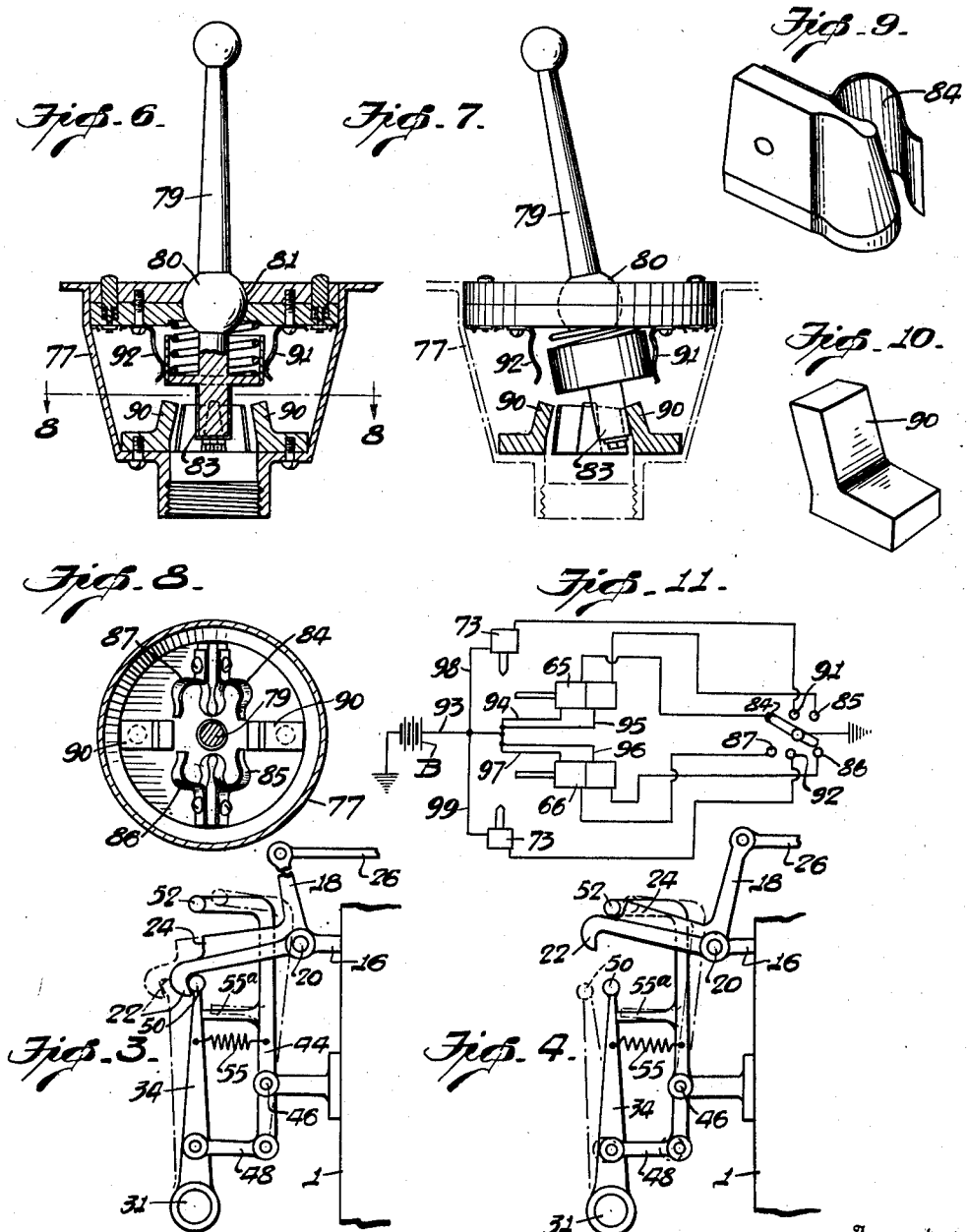

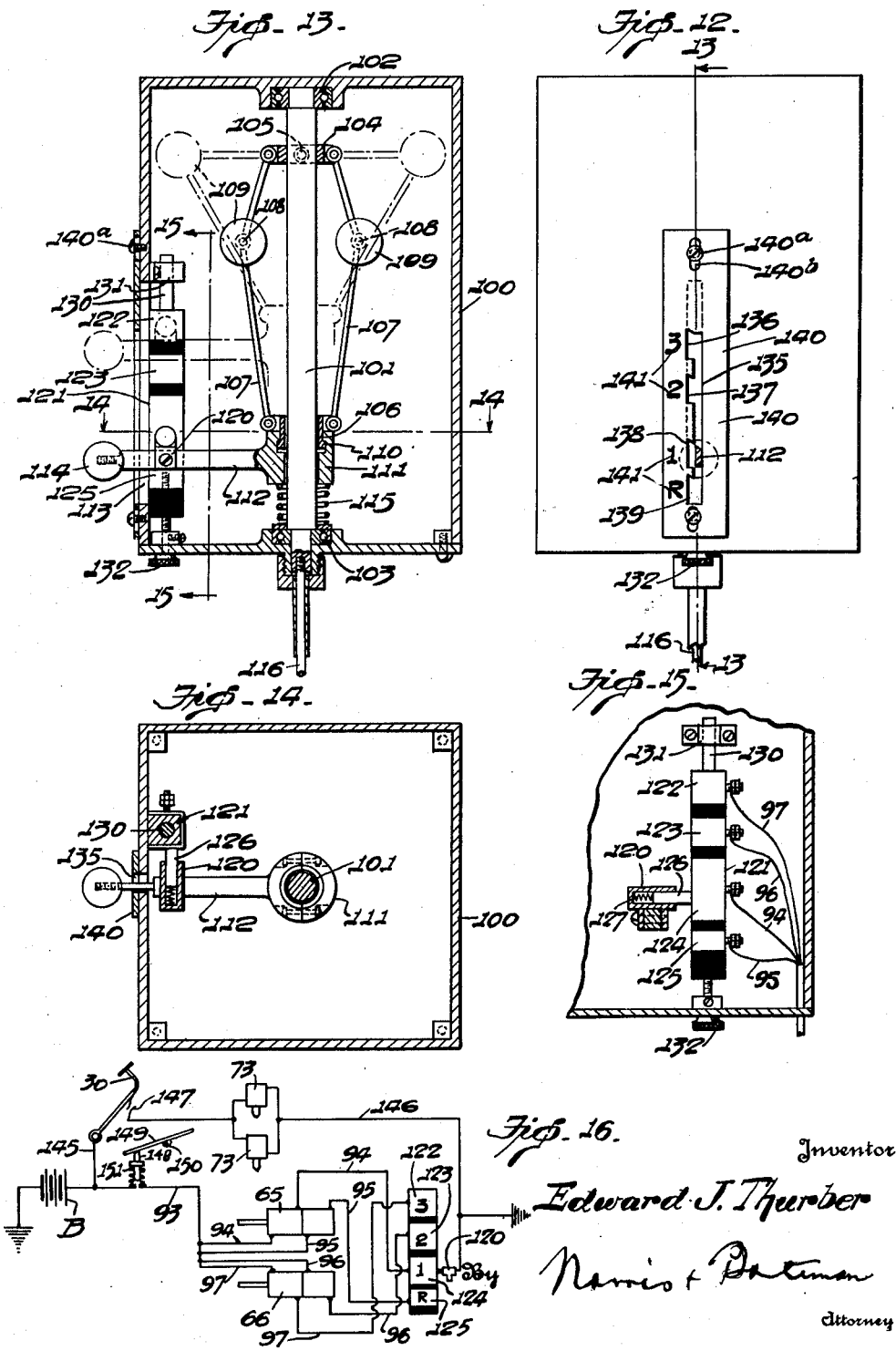

2,141,096

UNITED STATES PATENT OFFICE 2,141,096

GEAR SHIFTING MECHANISM

Edward J. Thurber, New Orleans, La., assignor of one-half to Ralph K. Rothrock, New Orleans, La.

Application November 16, 1934, Serial No. 753,391

32 Claims. (Cl. 192—.01)

The present invention relates to improvements in means for shifting the change speed gears or elements of an automobile transmission mechanism whereby the shifting of such gears is facilitated and the manual manipulation of a hand lever as heretofore provided for such purpose is rendered unnecessary.

One of the primary objects of the present invention is to provide a mechanically operated shifting mechanism which may be readily applied to transmission mechanisms of the conventional types commonly used upon automobiles without requiring alterations or modifications thereof.

Another object is to provide a very simple shifting mechanism which is operable by a pedal, preferably the usual clutch pedal, after the latter has operated sufficiently to release the driving clutch, to effect the desired speed changes with certainty.

Another object is to provide mechanical gear shifting mechanism of this class which employs solenoids for setting it for the different gear changes.

Another object is to provide means for locking the gear changing elements in one or another of their operative positions after being shifted to such position, solenoids being provided for releasing the locking means and thereby permitting one or another of the gear changing elements to return automatically to neutral or inoperative position.

A further object of the invention is to provide novel and improved control means for the shifting mechanism the movements of which simulate those of the usual hand operated gear shifting lever heretofore used generally on automobiles and to which drivers of automobiles are accustomed, so that automobile drivers may readily become familiar with the improved control means.

Another object is to provide novel and improved control means for the shifting mechanism which enables the circuits of the solenoids to be controlled automatically according to the speed of travel of the automobile, the actual speed change to be made however under the control of the driver thereof, and which also enables any desired speed change to be made selectively and under manual control of the driver, such control means also embodying means for indicating the gear changes for which the shifting device is set, all of the elements of such control means being preferably centralized in a single unit.

To these and other ends the invention consists in certain improvements and combinations and arrangements of parts all as will be hereinafter more fully described, the features of novelty being pointed out particularly in the claims at the end of this specification.

In the accompanying drawings:

Figure 1 is a vertical section through an automobile transmission mechanism provided with gear shifting mechanism according to the present invention;

Figure 2 is a front elevation of a portion of the structure shown in Figure 1 as viewed from the left hand side thereof;

Figures 3 and 4 are detail views showing diagrammatically the manner in which the shifting mechanism may be operated to effect different desired gear changes;

Figure 5 is a vertical section taken through the upper end of the steering column and the hub of the steering wheel of an automobile, showing control means for the shifting mechanism mounted therein;

Figure 6 is a detail sectional view of the control means, the same being shown in its normal or neutral position;

Figure 7 is a detail view of the control means, the same being shown set for a gear change;

Figure 8 is a transverse section through the control means, taken on the line 8—8 in Fig. 6;

Figures 9 and 10 are detail perspective views of portions of the control means;

Figure 11 is an electrical diagram showing the connections between the electrical elements of the shifting mechanism shown in the preceding figures;

Figure 12 is a view in elevation of another form of control means for the gear shifting mechanism;

Figure 13 is a vertical section through the control means, taken on the line 13—13 in Fig. 12;

Figure 14 is a horizontal section through the control means taken on the line 14—14 in Fig. 13;

Figure 15 is a detail view in section showing the movable contact member and the stationary contacts cooperative therewith; and Figure 16 is an electrical diagram showing the connections between the control means shown in Figs. 13 to 15 inclusive and the electrical elements of the shifting mechanism.

Similar parts are designated by the same reference characters in the different figures.

Gear shifting mechanism according to the present invention may be applied generally to automobile transmission mechanisms of the conventional forms commonly used upon automobiles and employing a pair of reciprocatory shifting bars connected respectively to the sliding gears or gear changing elements of the transmission mechanism, each of these bars being slidable from a normal or neutral position in either direction to effect one or another gear change. The preferred embodiments of the invention are shown in the accompanying drawings and will be hereinafter described in detail, but it is to be understood that the invention is not restricted to the precise construction shown since equivalent constructions are contemplated and such will be included within the scope of the claims.

In the present instance, wherein the invention is shown applied to a transmission of a well known or conventional type commonly used upon automobiles, 1 represents the casing of the transmission mechanism, 2 the main drive or clutch shaft driven as usual through the usual clutch from the automobile engine, 3 represents the main shaft of the transmission mechanism which is connected at its rear end as usual to the rear or driving wheels of the automobile, 4 represents the usual countershaft of the transmission mechanism driven from the driving or clutch shaft 2 by gears 5 as usual, the countershaft having first, second and reverse gears 6, 7 and 8 fixed thereon, and the main shaft 3 having a sliding gear 9 splined thereon and shiftable from its normal or neutral position into mesh either with the first speed gear 6 or with the usual reverse gearing connected to the reverse gear 8, the main shaft 3 also having a sliding clutch element 10 splined thereon and shiftable in one or the other direction from its normal neutral position to clutch or engage it with a second speed gear 11 on the shaft 3 or with a third or high speed clutch member 12 fixed on the main drive or clutch shaft 2.

The sliding gear 9 which sets the transmission mechanism for first or reverse gear in the usual and well known manner, is engaged by a shifting fork 13 fixed to a shifting bar 14 which is mounted to reciprocate in the transmission casing, and the slidable clutch element 10 which sets the transmission mechanism for second and third speeds in the usual and well known way, is engaged by a shifting fork 15 which is fixed to a shifting bar 16 which is mounted to reciprocate in the transmission casing. The transmission mechanism shown and described is of a well known conventional form and is set for the different gear changes by reciprocation of the shifting bars 14 and 16 in the usual and well known manner.

The shifting mechanism provided by the present invention comprises a pair of bell crank levers 17 and 18 which are pivotally mounted at 19 and 20 to the forward ends of the gear shifting bars 14 and 16 respectively. These bell crank levers have arms which extend forwardly therefrom and are provided with down-turned hooks 21 and 22 and also with upwardly extending shoulders 23 and 24 respectively. These bell crank levers also have arms which extend upwardly therefrom and are pivotally connected to controlling rods 25 and 26 respectively.

These bell crank levers provide means for the actuation of the respective shifting bars 14 and 16, the power for actuating the shifting bars being derived from a pedal which may be operated by a foot of the automobile driver, and it is preferable to employ the usual clutch pedal of the automobile for this purpose. As shown in the present instance, 30 represents the usual clutch pedal of an automobile which is fixed to the usual clutch shaft 31 which controls the engaging and disengaging of the driving clutch of the automobile, forward motion of the pedal serving to disengage or release the clutch and rearward motion of the pedal serving to engage the clutch to drive the automobile, as usual. The clutch pedal shaft 31, which may be fitted in suitable bearings 32 in a casing connected to the transmission casing, has a pair of levers 33 and 34 loosely mounted thereon, the hubs 35 and 36 of these levers having driving dogs 37 and 38 formed thereon, and a pair of collars 39 and 40 are fixed on the clutch pedal shaft and have driving dogs 41 and 42 formed thereon and arranged to cooperate with the driving dogs 37 and 38 respectively of the levers 33 and 34. When these levers and the clutch pedal occupy their normal positions, spaces are provided between the dogs 37 and 41 and 38 and 42 to permit the clutch pedal to be operated or swung forwardly a sufficient distance to disengage the driving clutch of the automobile, whereupon the dogs on the collars fixed to the clutch shaft engage the dogs on the levers 33 and 34 and thereby actuate these levers, causing them to swing forwardly as viewed in Figure 1. A second pair of levers 43 and 44 are pivoted to the front wall of the transmission casing at 45 and 46 respectively, the lower ends of these levers being operatively connected to the levers 33 and 34 by links 47 and 48 respectively, and the upper ends of the levers 43 and 44 are extended forwardly so as to overlie the upper ends of the levers 33 and 34 respectively. The forwardly extending ends of the bell crank levers 17 and 18 extend into positions between the upper ends of the levers 33 and 43 and 34 and 44 respectively. The upper ends of the levers 33 and 34 are provided with contact portions 49 and 50 respectively, and the upper ends of the levers 43 and 44 are provided with contact portions 51 and 52 respectively.

The lever arrangement described is such that when the lever 33 or 34 is swung forwardly or toward the left in Figure 1 by actuation of the clutch pedal to disengage the clutch, the upper end of the cooperating lever 43 or 44 will be swung rearwardly or in the opposite direction. If, during such movements of the levers, the hook 21 or 22 on one or the other of the bell crank levers is lowered to be engaged by the contact portion 49 or 50 of the lever 33 or 34, the shifting bar to which such bell crank lever is connected will be pulled forwardly, and if the forwardly extending portion of one or the other of the bell crank levers is raised to bring the upwardly extending shoulder 23 or 24 thereon into the path of the contact portion 51 or 52 on the lever 43 or 44, the shifting bar to which such bell crank lever is connected will be shifted rearwardly or toward the right in Figure 1. The actuation of one or the other of the shifting bars in a forward or rearward direction by the lever mechanism described is shown diagrammatically in Figures 3 and 4. Figure 3 shows the bell crank lever on one of the shifting bars set in position to be engaged by the lever 33 or 34 to shift the respective bar forwardly, and Figure 4 shows one of the bell crank levers set to be engaged by the lever 43 or 44 to shift the respective bar rearwardly, it being understood that when the levers 33 and 34 are swung forwardly by actuation of the clutch pedal to disengage or release the driving clutch, the levers 43 and 44 are simultaneously moved rearwardly. Since the pair of levers for each shifting bar are operative to shift such bar forwardly and rearwardly from its central or neutral position to set the gear element connected thereto for two different gear changes, the pairs of levers provided by the present invention serve to actuate the pair of shifting bars to effect the four gear changes usually provided in the conventional transmission mechanism.

Normally and while the clutch pedal 30 is in its normal position with the clutch engaged, the contact portions 51 and 52 on the levers 43 and 44 occupy positions above the contact portions 49 and 50 on the levers 33 and 34, the levers being held yieldingly in such position by a spring 55 which connects the levers of each pair. While the levers of each pair occupy this normal position, one or the other of the bell crank levers 17 and 18 may be rocked either in a direction to engage its downwardly directed hook 21 or 22 with the contact portion 49 or 50 of the lever 33 or 34 respectively or to engage the shoulder 23 or 24 with the contact portion 51 or 52 of the lever 43 or 44 respectively. The shifting bars 14 and 16 are normally held yieldingly in their central or neutral positions and are returned to such positions by pairs of springs 56 and 57, a pair of these springs being connected to each of the bars 14 and 16 and to the transmission casing, the springs of each pair being of equal power and being equalized in their action when the respective shifting bars are in neutral position.

Each of the levers 43 and 44 is provided with a stop 55ᵃ against which the respective lever 33 or 34 may come to rest under the action of the respective spring 55, thereby normally positioning the contact portions 49 and 51 and 50 and 52 one above the other, as shown in Fig. 1.

If desired, the lever mechanism described for actuating the shifting bars may be operated by fluid pressure, the clutch pedal shaft being shown provided for this purpose with a crank arm 60 which is fixed thereon and connected to a piston 61 which reciprocates in a cylinder 62 to which a pipe 63 may be connected. As shown in Figure 1, by supplying fluid pressure to the cylinder through the pipe 63, the pedal shaft 31 will be rotated in a direction to actuate the levers in directions to effect gear changes, and a spring 64 may be placed behind the piston 61 to return the shaft 31 to its normal position. By connecting the pipe 63 to the opposite end of the cylinder 62, the piston 61 may be actuated by vacuum obtained for example by connecting the pipe 63 to the intake manifold of the automobile engine.

The shifting mechanism hereinbefore described is preferably controlled electrically. For this purpose, the controlling rods 25 and 26 for the bell crank levers 17 and 18 carry cores which cooperate with double solenoids 65 and 66 respectively. Each of these solenoids embodies a pair of windings 67 and 68 and the core of each solenoid has springs 69 and 70 located at opposite sides thereof so as to normally hold the respective solenoid core in its central position. By this arrangement, each of the bell crank levers 17 and 18 will be normally held by such springs in disengaged relation with the actuating levers, as shown in Figure 1, but when one winding of one or the other of the solenoids is energized, the respective bell crank lever will be swung downwardly to bring the hook 21 or 22 thereon into position to be engaged by the contact portion 49 or 50 on the respective lever 33 or 34, and when the other winding of one or the other of the solenoids is energized, the respective bell crank lever will be swung upwardly to bring the shoulder 23 or 24 thereon into position to be engaged by the contact portion 51 or 52 on the lever 43 or 44 respectively. The four windings thus provided for the two solenoids enables each of the bell crank levers to be set in either of its two positions to effect movement of the respective shifting bar in one or the other direction to effect the gear changes.

Each of the shifting bars 14 and 16 is provided with a pair of suitably located notches 71 with which a spring plunger 72 engages to lock the respective shifting bar in its shifted position and thus retain the gear element connected thereto in engaged position. Each of these plungers constitutes the core of a solenoid 73 which, when energized, will disengage the locking pawl from the respective shifting bar and thus release the latter so that it may return to its normal neutral position under the action of its springs 56 and 57.

The solenoids 65 and 66 which set the shifting mechanism for the desired gear changes and the solenoids 73 which release the shifting bars for return to neutral position are preferably controlled by a switch mounted at the top of the steering column 75 and within the hub 76 of the usual steering wheel. This switch comprises preferably a casing 77 which may be fixed to the upper end of a tube 78 which is supported in fixed position within the steering column, and a switch lever 79 which projects upwardly from the switch casing. The switch lever 79 is rockable in different directions corresponding to the directions in which the usual hand operated gear shifting lever of an automobile is operated, to bring it into engagement with electrical contacts which set the shifting mechanism for gear changes corresponding to those made by similar movements of the usual hand shifting lever. The switch lever is provided for this purpose with a spherical portion 80 which fits into a socket 81 formed in the top of the casing 77 so that the switch lever may have a universal movement or may rock in any direction, and a spring 82 is connected to the switch lever and bears on the cover of the switch casing, its action being to maintain the switch lever normally in a central position in alignment with the axis of the steering column. The lower end of the switch lever 79 carries an electrical contact 83 which is engageable with any one of a set of electrical contacts 84, 85, 86 and 87, these latter contacts being preferably in the form of clips as shown so that they will hold the contact 83 in engagement therewith until disengaged therefrom by manual operation of the lever 79, and mounted in pairs at opposite ends of a slot the sides of which are defined by a pair of blocks 90 secured within the switch casing, the contact of the set engaged by the contact 83 on the switch lever 79 depending upon the direction in which the switch lever is rocked. A pair of electrical contacts 91 and 92 are also mounted within the switch casing in positions to be engaged by the switch lever 79 when the latter is brought into or occupies its middle or neutral position, as shown in Figure 6 or Figure 7.

The conventional battery B commonly used on automobiles may be utilized as a source of electric current for energizing the solenoids and these solenoids may be connected to the selecting switch in the manner shown diagrammatically in Figure 11. In this diagram one terminal of the battery B is shown grounded to the frame of the automobile and the other terminal thereof is connected by a conductor 93 to branch conductors 94 and 95 which are connected to the electrical contacts 84 and 85 respectively of the selecting switch and include in circuit therewith the respective windings of the solenoid 65, and the conductor 93 is also connected to branch conductors 96 and 97 which are connected to the contacts 86 and 87 respectively of the selecting switch and include in circuit therewith the corresponding windings of the solenoid 66. The conductor 93 from the battery is also connected by conductors 98 and 99 to the contacts 91 and 92 respectively, these latter conductors including in circuit therewith the windings of the solenoids 73 which release the locking pawls for the respective shifting bars of the transmission mechanism.

The operation of gear shifting mechanism constructed as hereinbefore described is briefly as follows. Normally, the switch lever 79 will occupy its central or neutral position in disengaged relation with the contacts 84, 85, 86 and 87, so that the solenoids 65 and 66 will be deenergized and the bell crank levers 17 and 18 will occupy their normal position clear of the paths of movement of the contact portions 49 and 50 and 51 and 52 on the levers 33 and 34 and 43 and 44 respectively. The shifting mechanism is operated to set the transmission mechanism for first speed by rocking the switch lever 79 in a direction to engage its contact 83 with the contact 84 which is connected to and closes the circuit through the winding of the solenoid 65 which when energized will swing the bell crank lever 17 in a direction to bring the hook 21 thereon into the path of the contact portion 49 on the lever 33. Actuation of the clutch pedal 30 will then first release the clutch, and then swing the lever 33 forwardly, shifting the bar 14 forwardly, thus placing the gear 9 in position for first speed forward. The shifting mechanism is set for second speed by rocking the switch lever 79 to engage its contact 83 with the contact 86 which is connected to and closes the circuit through the winding of the solenoid 66 which when energized will swing the bell crank lever 18 in a direction to bring the shoulder 24 thereon into the path of the contact portion 52 on the lever 44, and actuation of the clutch pedal will first release the clutch, and then cause the lever 44 to swing rearwardly, shifting the bar 16 rearwardly and thus bringing the gear changing element 10 into position for second speed forward. The shifting mechanism is set for third speed forward by rocking the switch lever 79 into a position to bring its contact 83 into engagement with the contact 87 which is connected to and closes the circuit through the winding of the solenoid 66, which, when energized, will swing the bell crank lever 18 in a direction to bring the hook 22 thereon into the path of the contact portion 50 on the lever 34. Actuation of the clutch pedal 30 will then first release the clutch, and then swing the lever 34 forwardly thereby causing the shifting bar 16 and the gear element 10 connected thereto to move forwardly and thereby set the transmission mechanism for third speed forward. The shifting mechanism is set for reverse by rocking the switch lever 79 in a direction to bring its contact 83 into engagement with the contact 85 which is connected to and closes the circuit through the winding of the solenoid 65 which when energized will swing the bell crank lever 17 in a direction to bring its shoulder 23 thereon into the path of the contact portion 51 on the lever 43. Actuation of the clutch pedal will then first release the clutch, and then swing the lever 43 rearwardly, thereby shifting the bar 14 and the gear 9 rearwardly, thereby setting the transmission mechanism for reverse.

Each time the switch lever 79 reaches its middle position while it is being shifted to make a gear change, or is brought into its central or neutral position to restore the gear changing elements of the transmission to neutral or non-operative condition, this switch lever will engage one or the other or both of the contacts 91 and 92 and will thereby energize the solenoid 73 which releases the locking pawl for one or the other, or these solenoids for both of the shifting bars, thereby permitting one or both of the shifting bars to return automatically to neutral position while each gear change is being made, and when the lever of the selecting switch is restored to its central or neutral position, as when the transmission mechanism is not in operation.

Since the gear shifting mechanism according to the present invention as hereinbefore described effects the different changes mechanically and under control of the automobile driver, it enables the speed at which the different gear changes are made to be controlled by the driver in the same manner as when the gear shifts or changes are made by the hand shifting lever heretofore used generally.

Figures 13 to 16 inclusive show another form of control means adapted to control the operation of the gear shifting mechanism shown in Figs. 1 to 4 inclusive. This embodiment of control means comprises a suitable casing 100 adapted to be mounted on any suitable part of the automobile and preferably within convenient reach and sight of the driver thereof, the casing having a speed responsive device mounted therein, this speed responsive device as shown in the present instance is similar in its general construction to that of a ball governor, it comprising a vertical shaft 101 rotatably mounted at its upper end and lower ends in bearings 102 and 103 supported in the casing, this shaft having a collar 104 fixed thereon as by a set screw 105, the shaft 101 also having a collar 106 which is mounted loosely thereon so that it may move longitudinally thereof. Pairs of toggle links 107 are pivotally connected at their upper and lower ends to the collar 104 and sleeve 106 and these links carry at their intermediate pivots 108 balls or weights 109.

The collar 106 is flanged at its lower end as shown at 110 and it is rotatably coupled to the hub 111 of an arm 112, this arm extending through a vertical slot 113 in the front wall of the casing 100 and being provided exteriorly of the casing with a knob or handle 114.

The links 107 and balls 109 will occupy the retracted position shown in Fig. 13 while the shaft 101 is not revolving, and a compression spring 115 is interposed between the hub 111 of the arm 112 and the bottom of the casing to support the arm 112 at the level shown in Fig. 13 and the balls 109 in the position shown in this figure, the spring 115 however being compressible under a downward force applied to the knob 114 to effect lowering of the arm 112 from the position shown in Fig. 13, such lowering of the arm 112 being permitted by further inward or retracting movement of the balls 109. The shaft 101 is connected as by a flexible shaft 116 to a suitable part of the automobile as for example the usual speedometer drive gear 117 which meshes with a cooperating gear 118 fixed on the main shaft 3 of the transmission mechanism. Consequently, as the speed of forward travel of the automobile increases from a stand-still, the shaft 101 will be revolved through the shaft 116 and the centrifugal force of the weights or balls 109 will swing them outwardly from the axis of the shaft to different extents, thereby raising the arm 112 to corresponding extents, the weights or balls 109 eventually reaching the uppermost positions shown by the dotted lines in Fig. 13.

The arm 112 carries an electrical contact 120, and a bar 121 of suitable insulating material is mounted within the casing and is provided with a set of contacts 122, 123, 124 and 125 which are spaced vertically thereon. The contact 120 carried by the arm 112 preferably embodies a contact brush 126 which is slidable laterally of said arm and has a spring 127 which urges it against the bar 121 and the contacts thereon. The bar 121 is preferably adjustable vertically or in parallelism with the direction of travel of the arm 112 in order to vary the relationship of the contacts on this bar with respect to the positions occupied by the brush 126 as positioned according to different speeds of the automobile, the upper end of the bar 121 being provided for this purpose with a shaft-like extension 130 which is slidable vertically in a guide or bearing 131, and an adjusting screw 132 is rotatably mounted in the bottom of the casing 100 and is threaded into the lower end of the bar 121, so that rotation of this screw will raise and lower the bar 121 and the contacts thereon.

One side of the slot 113 through which the arm 112 extends has a straight or uninterrupted wall 135 against which the arm 112 may travel. The other side of the slot 113 is provided with a set of notches 136, 137, 138 and 139 in which the arm 112 may be engaged, by moving it laterally of the slot, when the arm 112 is at the different levels where the brush 126 thereon engages the contacts 122, 123, 124 and 125 respectively. The slot 135 and the notches therein are preferably formed in an indicating plate 140 which may be fixed to the front wall of the casing 100, by screws 140ᵃ engaging in vertically elongated slots 140ᵇ in said plate, and this plate may be provided with a scale 141 which indicates the different speeds occupied by the control means when the arm 112 is opposite to or engaged in one or another of the notches 136, 137, 138 and 139, the characters of this scale indicating to the driver the speed or gear change in which the device is set at any time and also facilitating the manual shifting of the control means to select any desired gear change. The screw and slot adjustment for the indicator plate 140 enables it to be adjusted to conform with different vertical adjustments of the contact bar 121.

The control means shown in Figs. 12 to 15 inclusive may be connected to the electrical elements of the gear shifting mechanism shown in Figs. 1 to 4 inclusive, by a circuit similar to that shown in Fig. 11, the circuit for such control means being shown diagrammatically in Fig. 16. As shown in this figure, one terminal of the battery B is grounded and the other terminal is connected to a conductor 93 to which is connected a conductor 94 which leads to the contact 124 and includes therein the proper winding of the controlling solenoid 65 which when energized will set the shifting mechanism to place the transmission mechanism in first speed, the conductor 93 is connected by a conductor 95 which leads to the contact 125 and includes therein the winding of the solenoid which when energized will set the shifting mechanism to place the transmission mechanism in reverse, a conductor 96 is connected to the conductor 93 and leads to the contact 123 and includes therein the winding of the controlling solenoid 66 which when energized will set the shifting mechanism to place the transmission mechanism in second speed, and a conductor 97 is connected to the conductor 93 and leads to the contact 122 and includes therein the winding of the controlling solenoid 66 which when energized will set the shifting mechanism to place the transmission mechanism in third speed. The moving contact 120 which cooperates with the contacts 122, 123, 124 and 125 of the control means is grounded to the frame of the automobile through electrical contact with the casing 100 which is grounded on the automobile frame thus completing the return circuit to the battery B.

The solenoids 73 which release the shifting bars 14 and 16 of the transmission mechanism and thus permit any gear changing element therein to return to neutral position when released, under the action of the springs 56 and 57, are connected in a circuit 145, 146 leading from the conductor 93 to the ground respectively, this circuit including a switch 147 which is arranged to be closed by the clutch pedal 30 when the latter is actuated to disengage the driving clutch of the automobile.

The conductor 93 which includes the controlling solenoids 65 and 66 inserted therewith is controlled by a plunger switch 148 which is located beneath the rear end or heel portion of the usual accelerator pedal 149 of the automobile which is pivoted at 150, the plunger switch having a spring 151 therein which normally holds it in raised and circuit opening position, rocking of the rear or heel portion of the accelerator pedal downwardly depressing this plunger switch and thereby closing therethrough the circuit through the conductor 93.

The operation of the gear shifting mechanism as shown in Figs. 1 to 4 inclusive, provided with control means as shown in Figs. 12 to 16 inclusive is as follows:—While the automobile is at a stand-still the balls or weights 109 of the speed responsive device will occupy the relatively retracted positions shown by the full lines in Fig. 13 and the contact 120 on the arm 112 will be in engagement with the first speed contact 124. In order to set the shifting mechanism to place the transmission mechanism in first speed forward, the clutch pedal 30 is actuated sufficiently to disengage the driving clutch, such depression of this pedal closing the circuit 145, 146 through the closing of the switch 147, thereby energizing the solenoids 73 wherever any gear change might happen to be in operative position will be returned to neutral position. The accelerator pedal 149 is then rocked rearwardly while the clutch pedal is still in partially actuated position, causing the circuit through the conductor 93 to be closed through the plunger switch 148, conductor 95 and the appropriate winding of the controlling solenoid 65 to set the shifting mechanism. The clutch pedal 30 is then further or completely actuated whereby the appropriate lever of the shifting mechanism will be coupled to the appropriate shifting bar of the transmission mechanism and will shift such bar to set the transmission mechanism in first speed, as hereinbefore described. As the speed of the automobile is accelerated by opening the throttle of the automobile by the accelerator pedal 149 or otherwise, the weights or balls 109 of the speed responsive device will swing outwardly from the center of the shaft 101 by centrifugal force, thereby raising the arm 112 and when the speed of the automobile has reached a certain point, the contact 120 on the arm 112 will engage the second speed contact 123. To set the shifting mechanism for second speed, the clutch pedal 30 is partially actuated as before to energize the solenoids 73 and thereby effect return of the first speed gear element to neutral after which the accelerator pedal 149 is rocked rearwardly to actuate the plunger switch 148 and thereby complete the circuit through the conductor 93 and contact 123 and the appropriate winding of the solenoid 66 which when energized will set the shifting mechanism in condition to place the transmission mechanism in second speed, and further or complete actuation of the clutch pedal will cause the appropriate lever of the shifting mechanism to act on the appropriate shifting bar of the transmission mechanism to place the shiftable gear changing element in second speed. As the speed of the automobile is further accelerated, the balls or weights 109 of the speed responsive device will swing further outwardly from the center of the shaft 101 and toward or into the dotted line position shown in Fig. 13, thereby further raising the arm 112 and bringing the contact 120 thereon into engagement with the contact 122. To place the shifting mechanism in condition for a shift to third speed, the clutch pedal 30 is partially depressed, as before, thereby energizing the solenoids 73 and returning any gear in operative position to neutral, after which the accelerator pedal 149 is rocked rearwardly, causing the plunger switch 148 to close and complete the circuit through the conductors 93 and 97 and the appropriate winding of the solenoid 66, which, when energized, will set the shifting mechanism in condition to place the transmission mechanism in third speed, and further or complete actuation of the clutch pedal will then cause the appropriate lever of the shifting mechanism to act on the appropriate shifting bar of the transmission mechanism to set the same in third speed.

The control means just described thus automatically sets the shifting mechanism progressively for speed changes from first to second and second to third speed, as the forward speed of the automobile is accelerated. Obviously, such control means will also automatically set the shifting mechanism for speed changes retrogressively from third to second speed and second to first speed as the speed of the automobile decelerates, as in ascending a grade.

Such control means is not only operative automatically to set the shifting mechanism for progressive and retrogressive gear changes but is also operative manually as desired by the driver to set the shifting mechanism for any gear change desired. Such manual selection of any desired gear change is effected, irrespective of whether the automobile is in motion or at rest, by grasping the knob 114 and moving the arm 112 either upwardly or downwardly to bring the contact 120 thereon into engagement with the contact 122, 123, or 124, and the arm 112 may be retained or locked in such manually set position by moving it laterally into the appropriate notch 136, 137 or 138. The arm 112 may be thus raised or lowered for the manual selection of any desired gear change, notwithstanding the fact that it is connected to the speed responsive device since it is only necessary to apply sufficient force to the knob 114 to counteract any opposing force developed by the centrifugal action of the balls or weights 109.

In order to set the control means for reverse, the arm 112 is pushed downwardly against the action of the spring 115, thereby bringing the contact 120 into engagement with the contact 125. The shifting mechanism is then set for operation to place the transmission mechanism in reverse gear by partially depressing the clutch pedal 30 to energize the solenoid 73 and thereby cause return of any gear in operative position to neutral position, and then rocking the accelerator pedal 149 rearwardly to close the circuit through the plunger switch 148, the circuit through the conductors 93 and 95 connected to the contact 125 and including therein the appropriate winding of the solenoid 65 which when energized will set the shifting mechanism in condition to place the transmission mechanism in reverse being thereby completed, after which the clutch pedal is further or completely depressed, causing the appropriate lever of the shifting mechanism to actuate the appropriate shifting bar of the transmission mechanism to place the latter in reverse gear.

The manual control provided for the speed responsive control means shown in Figs. 12 to 16 inclusive enables any gear change to be made while the automobile is at a stand-still. The indicating scale 140 of the control means indicates the different gear changes for which the control means is set when acting automatically or in response to the speed of the automobile. The adjustment provided for the bar 121 which carries the contacts enables the control means to be set to close the circuits controlling the different speed changes so that the shifting mechanism will be set for the different gear changes at higher or lower speeds of travel of the automobile, and the indicating means also indicates the gear change for which the shifting mechanism is set. The spring 127 which actuates the traveling brush 126 acts to normally hold the arm 112 against the continuous or unnotched wall 135 of the slot 113, as during the automatic operation of the control means, but the arm 112 when moved laterally into one of the notches for hand gear selection will be retained therein by the undercutting of the upper walls of these notches and the corresponding beveling of the upper edge of the arm 112, as shown clearly in Fig. 12.

As will be seen from Figs. 12 to 15 inclusive, all of the contacts and other elements comprising the control means for all speed changes are contained as a single unit within the casing 100, thus facilitating the manufacture and installation of the control means and also placing all of the controls for gear changing in a centralized position within convenient reach of the automobile driver.

During each gear shifting operation, any gear changing element which may be in operative position is returned automatically to neutral position before the next gear change is completed, by the initial actuation of the clutch pedal which, as hereinbefore explained, releases the locking pawls for the shifting bars, which clutch pedal operation provides sufficient pause to permit any gear changing element to return to neutral position under the action of the return springs for the shifting bars of the transmission mechanism.

I claim as my invention:—

1. Shifting mechanism for an automobile transmission mechanism embodying a shiftable gear changing element, comprising a pair of actuating members each pivotally supported adjacent to one end, said members being connected to swing about their respective pivots in reverse directions, and a single controlling member engageable with the other end of one or the other of said members to be actuated thereby and to operatively connect said members to said shiftable element to move it in one or another direction.

2. Shifting mechanism for an automobile transmission mechanism embodying a shiftable gear changing element, comprising a pair of levers each pivoted at one end, said levers being connected to move simultaneously in opposite directions, and a single member connected to said shiftable element and movable into engagement with the free end of one or the other of said levers to be actuated thereby and move said element in one or the other direction.

3. Shifting mechanism for an automobile transmission mechanism embodying a shiftable gear changing element, comprising a pair of actuating members each pivoted at one end, said members being connected to move in reverse directions, a single controlling member connected to said shiftable element and engageable with the other end of one or the other of said members to operatively connect them to said shiftable element to move it in one or another direction, and a pedal connected to said actuating members for operating them.

4. Shifting mechanism for an automobile transmission mechanism embodying a shiftable gear changing element, comprising a pair of actuating members each pivotally supported adjacent to one end, said members being connected to swing in reverse directions, a single controlling member connected to said shiftable gear changing element and engageable with the other end of one or the other of said members to operatively connect them to said shiftable element to move it in one or another direction, and a clutch pedal having a lost-motion connection with said actuating members for operating them to move said shiftable element to effect a gear change by the clutch disengaging movement of the clutch pedal after said pedal has disengaged the clutch.

5. Shifting mechanism for an automobile transmission mechanism embodying a shiftable gear changing element, comprising a pair of actuating members each pivoted at one end, said members being connected to move simultaneously in opposite directions and having on their other free ends adjacently located oppositely movable actuating portions located in a common plane, and a single controlling member movable in opposite directions in the same plane with said actuating portions and having actuating portions thereon engageable respectively with the actuating portions on said actuating members to move said shiftable gear changing element in one or another direction.

6. Shifting mechanism for an automobile transmission mechanism embodying a shiftable gear changing element, comprising a pair of actuating members connected to move in reverse directions, and a bell crank lever pivotally connected to said shiftable element and having reversely positioned portions on one arm thereof engageable with one or the other of said actuating members, and controlling means for said bell crank lever connected to the other arm thereof.

7. Shifting mechanism for an automobile transmission mechanism embodying a shiftable gear changing element, comprising a pair of actuating members connected to move in reverse directions, a controlling member engageable with one or the other of said members to operatively connect them to said shiftable element to move it in one or another direction, and solenoid means for governing the engagement of said controlling member with one or the other of said actuating members.

8. Shifting mechanism for an automobile transmission mechanism embodying a shiftable gear changing element, comprising a pair of actuating members connected to move simultaneously in reverse directions, a single controlling member connected to said shiftable element and engageable with one or the other of said members to operatively connect them to said shiftable element to move it in one or another direction, and fluid pressure operated means for operating said actuating members.

9. Shifting mechanism for an automobile transmission mechanism embodying a pair of shiftable gear changing elements, comprising actuating means for moving said elements in one or another direction to effect different gear changes, solenoids for governing the gear changing operations of said actuating means, and controlling means for said solenoids for selectively controlling the gear changing operations of said actuating means including a member mounted to rock into a plurality of positions, electrical contacts engageable respectively by said member when rocked into said positions, and electrical connections between said contacts and the respective solenoids.

10. Shifting mechanism for an automobile transmission mechanism embodying a pair of shiftable gear changing elements, comprising actuating means for moving said elements in one or the other direction to effect four different gear changes, solenoids for governing the different gear changing operations of said actuating means, a controlling switch lever mounted to rock selectively into four different positions corresponding to the different gear changes, electrical contacts engageable respectively by said switch lever when brought into said positions, and electrical connections between said contacts and the respective solenoids.

11. Shifting mechanism for an automobile transmission mechanism embodying a pair of shiftable gear changing elements, comprising actuating means for moving said elements in one or another direction, solenoids for governing said actuating means, locking means for holding said shiftable members in their different operative positions, releasing solenoids for said locking means, means for restoring said shiftable elements to neutral positions when said locking means is released, a switch member mounted to rock from a central position into different operative positions, electrical contacts engageable respectively by said switch member when rocked into said operative positions, electrical connections between said contacts and the respective solenoids governing the actuating members, and electrical contacts engageable by said switch member when brought into its central position and having electrical connections with said releasing solenoids.

12. Shifting mechanism for an automobile transmission mechanism embodying a pair of shiftable gear changing elements, comprising actuating means for moving said elements in one or another direction, solenoids for governing said actuating means, electro-magnetically controlled means for restoring said elements to neutral position, a set of four main electrical contacts arranged symmetrically and electrically connected respectively to said governing solenoids, supplemental contacts located between pairs of said main contacts and connected to said neutral restoring means, and a switch lever pivoted centrally with respect to said contacts and having an operating handle at one end and a contact portion at its other end movable into engagement with one or another of said main contacts and engageable with at least one of said supplemental contacts while moving from one to another of the main contacts.

13. Shifting mechanism for an automobile transmission mechanism having a plurality of shiftable speed changing elements, comprising actuating mechanism for said elements having a plurality of electro-magnetic devices for rendering it differently operative upon said elements to effect different gear changes, electro-magnetic means for causing restoration of said elements to neutral condition, clutch pedal actuated means for controlling the said electro-magnetic means to restore said elements to neutral independently of said electro-magnetic devices, and separate speed-responsive means for controlling said plurality of electro-magnetic devices.

14. Shifting mechanism for an automobile transmission mechanism having a plurality of shiftable speed changing elements, comprising actuating mechanism for said elements having a plurality of electro-magnetic devices for rendering it differently operative upon said elements, electro-magnetic means for causing restoration of said elements to neutral condition, separate means for controlling said electromagnetic means and said plurality of electro-magnetic devices, a clutch pedal and switch operative thereby, an accelerator pedal and switch controlled thereby, an electrical circuit including said electro-magnetic means and clutch pedal operated switch, and a separate electrical circuit including said plurality of electro-magnetic devices and accelerator operative switch.

15. Shifting mechanism for an automobile transmission mechanism embodying a plurality of gear changing elements, comprising actuating mechanism for said elements having a plurality of electro-magnetic devices for rendering it differently operative upon said elements, and control means for said devices embodying a plurality of contacts connected to said devices, a movable contact to cooperate with said plurality of contacts, a speed-responsive device for actuating said movable contact to engage it with some of said other contacts, and means yieldable to permit said movable contact to be engaged with another of said plurality of contacts.

16. Shifting mechanism for an automobile transmission mechanism embodying a plurality of gear changing elements, comprising actuat'ng mechanism for said elements having electro-magnetic controlling devices, a series of contacts connected to said devices, an arm carrying a movable contact to cooperate with said series of contacts, speed responsive means for moving said arm and movable contact, and a member having a slot in which said arm is guided, one side of said slot having notches in which said arm is engageable to hold the movable contact in engagement with one or another of said series of contacts.

17. Shifting mechanism for a transmission mechanism embodying a plurality of speed changing elements, comprising actuating mechanism for said elements having electro-magnetically controlled devices for rendering it differently operative upon said elements, a series of contacts connected to said devices, a cooperative movable contact, speed responsive means connected to said movable contact for moving it into engagement with one or another of certain contacts of said series of contacts, one of the contacts of the series being beyond the range of movement of the movable contact by the speed responsive means, and means for restricting the movement of said cooperative contact by the speed responsive device and for rendering said cooperative contact settable at will into engagement with one or another of said series of contacts and with the contact thereof beyond the range of movement of the movable contact by the speed responsive means.

18. In an automobile having an engine provided with a throttle and an accelerator pedal controlling it, and a transmission mechanism embodying a plurality of speed changing gear elements, means for selectively setting said gear changing elements in condition for different speeds, and means operative to arrest the movement of the accelerator pedal when it assumes throttle closing position and operable by a further movement of the accelerator pedal for determining the time when a speed change is made.

19. In an automobile having an engine provided with a throttle and an accelerator pedal controlling it, and a transmission mechanism embodying a plurality of speed changing gear elements, means for selectively setting said gear changing elements in condition for different speeds, and means operative to arrest the movement of the accelerator pedal when it assumes throttle closing position and operable by movement of the accelerator pedal independently of the throttle for determining the time when a speed change is made.

20. In an automobile having an engine provided with a throttle and an accelerator pedal movable in one direction to open said throttle and in the opposite direction to close it, and a transmission mechanism embodying a plurality of speed changing elements for connecting the engine to the automobile to drive it at different speeds, means for selectively setting said gear changing elements for different speeds, and means located to arrest the movement of the accelerator pedal when it assumes throttle closing position and operative upon movement of the accelerator pedal beyond throttle closing position for effecting a selected gear change.

21. In a variable speed transmission mechanism embodying a plurality of elements settable for different speeds, actuating means for setting said elements for different speeds, selecting means for controlling the operation of the actuating means to effect one or another speed change, a clutch for applying power to the transmission mechanism, a lost-motion connection between said actuating means and the clutch for causing concurrent operation of the actuating means and the clutch and permitting operation of the clutch independently of said actuating means, and a single power element having a single connection to the clutch and said actuating means for operating the clutch and said actuating means.

2,141,096

22. In an automobile having an engine provided with a throttle and a controlling member therefor, a variable speed automobile transmission mechanism embodying a plurality of elements settable for different speeds, actuating means for setting said elements for different speeds, selecting means controlled according to the speed of the automobile and also controllable manually for controlling the operation of the actuating means to effect one or another speed change, a clutch for applying power to the transmission mechanism, a single power element having a single connection to the clutch and said actuating means for operating the clutch and said actuating means, and means controlled by said throttle controlling member and operable while the throttle is closed for determining the time when the speed changes are to be made by said actuating means.

23. In an automobile having an engine provided with a power controlling element, a variable speed transmission mechanism embodying a plurality of elements settable for different speeds, actuating means for setting said elements for different speeds, means for restoring said elements to neutral, selecting means for controlling the operation of the actuating means to effect one or another speed change, clutch means for applying power from the engine to the transmission mechanism, a single power element having a single connection to the clutch means and said actuating means for operating the clutch means and said actuating means, means controlled by the clutch means for controlling said neutral restoring means and means controlled by said power controlling element for controlling the operation of said actuating means to set the speed changing elements for selected speeds.

24. Shifting mechanism for an automobile transmission mechanism embodying a pair of shiftable gear changing elements, comprising actuating means for moving said elements in one or the other direction to effect four different gear changes, means for restoring said elements to neutral, means governing the different gear changing operations of said actuating means and the restoring of the gear changing elements to neutral, a controlling lever mounted to rock selectively into one or another of two substantially parallel paths at opposite sides of a medial plane and to move in said paths into four different positions and neutral corresponding to the different gear changes and neutral, controlling means engageable respectively by said lever when brought into said positions and neutral, and means operatively connecting said controlling means and said governing means.

25. Shifting mechanism for an automobile having a steering column and transmission mechanism embodying a pair of shiftable gear changing elements, comprising actuating means for moving said elements in one or the other direction to effect four different gear changes and for restoring said elements to neutral, a controlling lever mounted on the steering column to rock selectively in an arc into one or another of two substantially parallel paths and to rock selectively in arcs in said paths into four different positions and neutral corresponding to the different gear changes and neutral, and controlling means rendered operative by said lever when brought into said positions and neutral to govern the different gear changing operations of said actuating means and the restoring of the gear changing elements to neutral.

26. Shifting mechanism for an automobile transmission mechanism embodying a pair of shiftable gear changing elements, comprising actuating means for moving said elements in one or the other direction to effect four different gear changes and for restoring said elements to neutral, a controlling lever mounted to swing selectively in an arc for swinging movement in one or another of a pair of substantially parallel arcs into four different positions and neutral corresponding to the different gear changes and neutral, controlling means rendered operative by said lever when brought into said positions and neutral to govern the different gear changing operations of said actuating means and the restoring of the gear changing elements to neutral, and means for holding said controlling lever in neutral position.

27. Shifting mechanism for an automobile transmission mechanism embodying a pair of shiftable gear changing elements, comprising actuating means for moving said elements in one or the other direction to effect four different gear changes and for restoring said elements to neutral, a controlling lever mounted to swing selectively in an arc for swinging movement in one or another of two substantially parallel arcs into four different positions and neutral corresponding to the different gear changes and neutral, controlling means rendered operative by said lever when brought into said positions and neutral to govern the different gear changing operations of said actuating means and the restoring of the gear changing elements to neutral, and means for holding said controlling lever in different positions corresponding to the different gear changes.

28. Shifting mechanism for an automobile transmission mechanism embodying a pair of shiftable gear changing elements, comprising actuating means having means for connecting it to one or another of said gear changing elements for moving said elements in one or the other direction to effect four different gear changes and for restoring said elements to neutral, a controlling lever mounted to move selectively in either of two substantially parallel paths into four different positions arranged in pairs at opposite sides of a medial plane to control the gear changes to be made by the respective gear changing elements and into neutral to restore said elements to neutral, controlling means rendered operative by said lever when brought into said positions and neutral to govern the different gear changing operations of said actuating means and the restoring of the gear changing elements to neutral, and means for retaining said controlling lever in one or another of said positions in which it is set.

29. Shifting mechanism for an automobile transmission mechanism embodying a pair of shiftable gear changing elements, comprising actuating means capable of being connected to one or the other of said gear changing elements for moving said elements in one or the other direction to effect four different gear changes and for restoring said elements to neutral, a controlling lever mounted to move to either side of a medial plane and rockable in substantially parallel arcs selectively into four different positions arranged in pairs at opposite sides of such medial plane to control the gear changes to be made by the respective gear changing elements and into neutral to restore said elements to neutral, controlling means rendered operative by said lever when brought into such positions and neutral to govern the different gear changing operations of said actuating means and the restoring of the gear changing elements to neutral, and means for connecting the actuating means to one of the gear changing elements when the controlling lever is in one or the other position at one side of said medial plane and for connecting the actuating means to the other gear changing element when the controlling lever is in one or the other position at the other side of said medial plane and for controlling the gear changing movements of the actuating means.

30. In a motor propelled vehicle having a variable speed transmission mechanism to provide a plurality of forward speeds and neutral, a power actuated clutch and speed changing means for said mechanism, the operation of the speed changing means being dependent upon the position of the clutch, means controllable automatically according to the speed of the vehicle and also controllable manually for selecting all of said forward speeds and neutral, a fuel control element, means operative by said element for controlling the operation of the speed changing means, and manual means for actuating the speed changing means independently of the power actuation thereof.

31. In a motor propelled vehicle having an engine provided with a fuel control element, variable speed ratio transmission mechanism, and a power operated clutch and speed ratio changing means for said mechanism, the operation of the speed ratio changing means being controlled by the fuel control element, speed responsive means for automatically setting the speed ratio changing means to set said mechanism for different speed ratios according to the speed of the vehicle, and means operable at will to counteract the action of the speed responsive means and set the speed ratio changing means for a change to a lower speed ratio dependent upon the position of the fuel control element prior to disengagement of said clutch.

32. In a motor propelled vehicle having a variable speed transmission mechanism embodying a plurality of gear changing elements shiftable to provide a plurality of forward speeds and neutral, a power actuated clutch and speed changing means for said mechanism, the operation of the speed changing means being dependent upon the disengagement of the clutch, means for connecting and disconnecting the speed changing means with respect to one or another of the gear changing elements, means controllable automatically according to the speed of the vehicle and also controllable manually for selecting the forward speeds and neutral, a fuel control element, and means dependent upon the position of the fuel control element prior to disengagement of said clutch for controlling the operation of the speed changing means.

EDWARD J. THURBER.